United States Patent
Poulsen

(10) Patent No.: US 9,032,131 B2
(45) Date of Patent: *May 12, 2015

(54) SYSTEMS AND METHODS FOR ENCODING CONTROL MESSAGES IN AN AUDIO BITSTREAM

(75) Inventor: Jens Kristian Poulsen, Kitchener (CA)

(73) Assignee: BlackBerry Limited, Waterloo (CA)

( * ) Notice: Subject to any disclaimer, the term of this patent is extended or adjusted under 35 U.S.C. 154(b) by 900 days.

This patent is subject to a terminal disclaimer.

(21) Appl. No.: 13/020,850

(22) Filed: Feb. 4, 2011

(65) Prior Publication Data

US 2012/0203560 A1 Aug. 9, 2012

(51) Int. Cl.
*G06F 13/14* (2006.01)
*G06F 13/36* (2006.01)
*G06F 3/16* (2006.01)
*G06F 13/10* (2006.01)
*G06F 13/38* (2006.01)

(52) U.S. Cl.
CPC ............... *G06F 3/162* (2013.01); *G06F 13/10* (2013.01); *G06F 13/38* (2013.01); *G06F 13/14* (2013.01)
USPC .......................................... 710/305; 710/310

(58) Field of Classification Search
CPC ............ G06F 13/10; G06F 13/14; G06F 3/38
USPC .................................................. 710/305–317
See application file for complete search history.

(56) References Cited

U.S. PATENT DOCUMENTS

| | | | |
|---|---|---|---|
| 5,532,556 A | 7/1996 | Anderson et al. | |
| 6,182,180 B1 * | 1/2001 | Liu et al. | 710/310 |
| 6,205,504 B1 * | 3/2001 | Faust et al. | 710/305 |
| 6,507,299 B1 | 1/2003 | Nuijten | |
| 6,567,780 B2 | 5/2003 | Rhoads | |
| 6,737,957 B1 | 5/2004 | Petrovic et al. | |
| 6,944,298 B1 | 9/2005 | Rhoads | |
| 6,947,893 B1 | 9/2005 | Iwaki et al. | |
| 7,324,159 B2 | 1/2008 | Eveleens et al. | |
| 7,365,669 B1 | 4/2008 | Melanson | |

(Continued)

FOREIGN PATENT DOCUMENTS

WO 2009045904 4/2009

OTHER PUBLICATIONS

European Patent Office, Extended European Search Report for European Patent Application Serial No. 11153324.6, mailed Jul. 28, 2011.

(Continued)

*Primary Examiner* — Samuel G Neway
(74) *Attorney, Agent, or Firm* — Perry + Currier Inc.

(57) ABSTRACT

An audio system including a first audio unit and a second audio unit coupled to the first audio unit through an audio bus. A first processor is coupled to the first audio unit. The first processor is configured to transmit bits comprising audio content to the second audio unit over the audio bus. The first processor is further configured to receive a control command selected from a plurality of control commands, and in response, interrupt the bits comprising audio content and send a preamble and a control message on the audio bus, wherein the control message corresponds to the control command. A second processor is coupled to the second audio unit. The second processor is configured to monitor the audio bus for a preamble, and if a preamble is detected, then process the control message and execute the corresponding control command.

19 Claims, 6 Drawing Sheets

(56) References Cited

U.S. PATENT DOCUMENTS

| | | | |
|---|---|---|---|
| 7,590,070 | B1 | 9/2009 | Asawa et al. |
| 2004/0068535 | A1* | 4/2004 | Subbiah et al. ............... 709/200 |
| 2007/0121006 | A1* | 5/2007 | Kim .............................. 348/515 |
| 2007/0162665 | A1* | 7/2007 | Lee ................................. 710/62 |
| 2008/0181186 | A1* | 7/2008 | Rofougaran .................. 370/338 |
| 2009/0024235 | A1 | 1/2009 | Kim |
| 2009/0116475 | A1 | 5/2009 | Krzyzanowski et al. |
| 2009/0119439 | A1* | 5/2009 | Zou et al. ...................... 710/310 |
| 2010/0022183 | A1 | 1/2010 | Ryle et al. |

OTHER PUBLICATIONS

International Telecommunication Union, Procedures for the simultaneous transmission of data and digitally encoded voice signals over the GSTN, or over a 2-wire leased point to point telephone type circuits, Aug. 1, 1996.

Hanna Moore Curley, Response to Extended European Search Report for European Patent Application Serial No. 11153324.6 dated Feb. 13, 2013.

European Patent Office, Notice of Intent to Grant for European Patent Application Serial No. 11153324.6 dated Jul. 5, 2013.

Canadian Patent Office, Office Action for Canadian Patent Application No. 2,766,527, mailed Jul. 18, 2013.

Walt Kester, MT-022 Tutorial: ADC Architectures III: Sigma-Delta ADC Basics, 2009.

NXP Semiconductors, TFA9881: PDM input mono class D audio amplifier, marked as confidential as of May 18, 2009.

The Society of Motion Picture and Television Engineers. Proposed SMPTE Standard for Television—Format for Non-PCM Audio and Data in an AES3 Serial Digital Audio Interface, SMPTE Journal, Apr. 2000.

Benjamin W. Wah, Xiao Su and Dong Lin. A Survey of Error-Concealment Schemes for Real-Time Audio and Video Transmissions over the Internet. Department of Electrical and Computer Engineering and the Coordinated Science Laboratory University of Illinois at Urbana-Champaign, Urbana, IL 61801, USA Dec. 2000.

Wen-Tsai Liao, Jeng-Chun Chen and Ming-Syan Chen. Adaptive Recovery Techniques for Real-Time Audio Streams. Electrical Engineering Department National Taiwan University, Taipei, Taiwan, ROC. Apr. 2001.

Prima LT Users Guide—Feature Overview and Model Description. Online at <http://www.musicamusa.com/techdocs/Manual/It/Ituser1.PDF>. Available as early as Apr. 2001.

European Patent Office. Extended European Search Report for European Patent Application Serial No. 11184889.1. Mailed Mar. 28, 2012.

* cited by examiner

SYSTEMS AND METHODS FOR ENCODING CONTROL MESSAGES IN AN AUDIO BITSTREAM

FIELD

The embodiments herein relate to electronic devices, and in particular to systems and methods for encoding control messages in an audio bitstream.

INTRODUCTION

Electronic devices, including portable electronic devices such as smart phones, have gained widespread use and may provide a variety of functions including telephonic services, electronic text messaging and other personal information manager (PIM) application functions.

Many such electronic devices include audio components such as microphones and speakers for capturing, transmitting, and producing sound. These audio components are often digital components that communicate by sending digital signals between one another. Often, the signals sent between two audio components are digital representations of sounds such as voice communications or music.

Two audio components may communicate with one another directly or indirectly in a variety of configurations when they are part of the same device or when they are part of separate devices. For example, two audio components could be a codec and a digital amplifier on a smart phone device or other portable electronic device.

DRAWINGS

For a better understanding of the embodiments described herein, and to show how they may be carried into effect, reference will now be made, by way of example, to the accompanying drawings.

DESCRIPTION OF VARIOUS EMBODIMENTS

Figure 1:
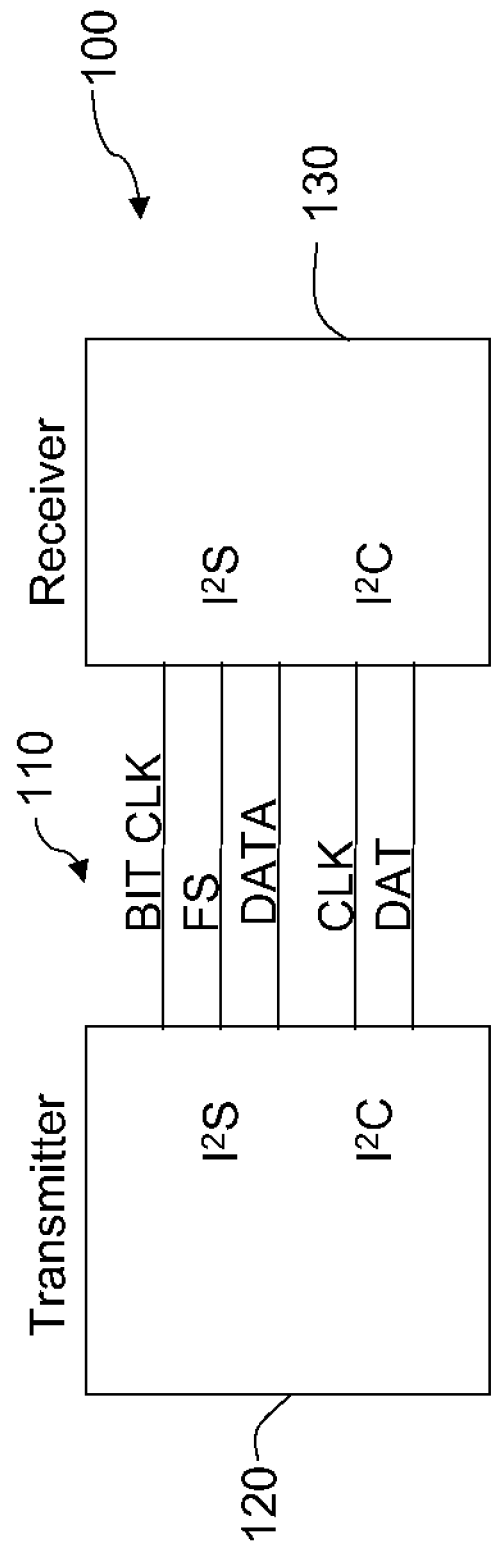
FIG. 1 is a schematic representation of a first known audio system.

Generally, some embodiments as described herein may be implemented on one or more electronic devices, which may include a wide range of devices, such as mobile phones, smart phones, personal digital assistants (PDAs), personal or desktop computers, notebooks, laptops, digital audio/video players, digital audio/video recorders, tablet computers, and so on.

On some of these electronic devices, particular computer resources (e.g. memory capacity, processing power and screen space) may be more limited than on other devices. A portable smart phone, for example, may have a smaller display and less memory capacity than a personal computer, which may have a larger display and more memory. However, the concepts as described herein are not limited to any particular kind of electronic device, but are generally suitable for use on various electronic devices with various computer resources.

In some embodiments, the electronic device may be a portable electronic device, such as a smart phone or PDA, and which may have voice communication capabilities, data communication capabilities, or both, over one or more wired connections or a wireless connection.

Some embodiments herein are directed to an audio system comprising a first audio unit; a second audio unit coupled to the first audio unit through an audio bus; a first processor coupled to the first audio unit, the first processor configured to transmit bits comprising audio content to the second audio unit over the audio bus; the first processor further configured to receive a control command selected from a plurality of control commands, and in response, interrupt the bits comprising audio content and send a preamble and a control message on the audio bus, wherein the control message corresponds to the control command; and a second processor coupled to the second audio unit, the second processor configured to monitor the audio bus for a preamble, and if a preamble is detected, then process the control message and execute the corresponding control command.

The first processor may be further configured to analyze the bits comprising audio content before they are transmitted to the second audio unit to detect a naturally occurring preamble, and if a naturally occurring preamble is detected then alter at least one bit of the naturally occurring preamble to form an altered audio bitstream and transmit the altered audio bitstream over the audio bus instead of the naturally occurring preamble.

The first processor may be configured to monitor the audio content prior to transmitting the preamble to detect the presence of bits that correspond to at least a portion of the preamble. If the first processor detects the presence of bits that correspond to at least a portion of the preamble, the first processor may be further configured to modify the audio content corresponding to at least a portion of the preamble prior to sending the preamble. If the first processor detects the presence of bits that correspond to at least a portion of the preamble, the first processor may be further configured to delay sending the preamble until after detecting a portion of the audio content that does not correspond to at least a portion of the preamble.

The control message may includes an error control, and the second processor may be configured to ignore a control message if the error control indicates that an error has occurred.

The first audio unit and second audio unit may be components of the same device. The first audio unit may be a codec and the second audio unit may be an amplifier. The device may be portable electronic communication device. The first audio unit may be a component of a first device and the second audio unit may be a component of a second device.

The preamble may be selected such that the probability of the preamble occurring in a natural audio bitstream is below a selected value. The length of the preamble may be selected to be sufficiently long such that the probability of the preamble occurring in a natural audio bitstream is below a selected value.

The bits comprising audio content may be an audio bitstream. The bits comprising audio content may include audio data words, and the preamble may be selected such that a probability of the preamble occurring in a sequence of natural audio data words is below a selected value. In some embodiments, replacing at least a portion of the bits comprises replacing a least significant bit of at least a portion of the audio data words.

Some embodiments herein are directed to a method for encoding control messages in an audio system, comprising transmitting bits comprising audio content from a first audio unit to a second audio unit over an audio bus, receiving a control command selected from a plurality of control commands, interrupting the bits comprising audio content, and sending a preamble and a control message from the first audio unit to the second audio unit on the audio bus, the control message corresponding to the control command, wherein the second audio unit monitors the audio bus for a preamble, and if a preamble is detected, then processes the control message and executes the corresponding control command.

The method may further comprise analyzing the bits comprising audio content before they are transmitted to the second audio unit to detect a naturally occurring preamble, and if a naturally occurring preamble is detected then altering at least one bit of the naturally occurring preamble to form an altered audio bitstream and transmitting the altered audio bitstream over the audio bus instead of the naturally occurring preamble.

The method may further comprise monitoring the audio content prior to transmitting the preamble to detect the presence of bits that correspond to at least a portion of the preamble. In some embodiments, if bits that correspond to at least a portion of the preamble are detected, then modifying the audio content corresponding to at least a portion of the preamble prior to sending the preamble. In some embodiments, if bits that correspond to at least a portion of the preamble are detected, then delaying sending the preamble until after detecting a portion of the audio content that does not correspond to at least a portion of the preamble.

Various embodiments described herein relate to the communication of control signals within an audio system. In various embodiments, the communication occurs between a first audio unit and a second audio unit in the audio system. In some embodiments, the audio system may be a single device such as a portable electronic device (e.g. a smart phone). In some such embodiments, the first and second audio units can be components of the device. For example, the first audio unit may be a codec of the smart phone and the second audio unit may be an amplifier with one or more digital inputs. The first and second audio units may include a variety of different hardware components.

In some embodiments, the system may include more than one device, such as a smart phone and a headset device for use with the smart phone. In some such embodiments, the first audio unit may be a component of the headset device and the second audio component may be a component of the smart phone, or vice versa.

Various embodiments disclosed herein relate generally to encoding control messages on an audio bus line. In some embodiments, control messages are encoded in an audio bitstream. In other embodiments, the control signals are combined with the data bits in an audio interface that transmits audio data words, such as a standard I²S audio interface.

As used herein the term "audio data words" refers to bits or sets of bits that are processed in groups as words of data and that represent audio content. Bits "represent audio content" when they include any coded representation of one or more sounds (e.g. voice sounds, music, etc.) As used herein the term "audio bitstream" refers to bits that represent audio content but are not processed as words of data. As used herein "bits comprising audio content" includes any set of bits that includes bits representing audio content. An example of an audio bitstream can include (but is not limited to) the output of a delta sigma modulator.

Reference is now made to FIG. 1, which is a schematic diagram illustrating a first known audio system 100 having a known communication interface 110 between a first audio unit 120 and a second audio unit 130. As can be seen, interface 110 includes five terminals, and both the I²S and I²C interfaces are used (as further described below).

The I²S interface is also known as the Inter-IC Sound interface, and is an electrical serial interface standard that can be used to couple digital audio components together. The I²S interface uses three terminals: a bit clock, a word select, and a data line. Generally, the I²S interface allows for audio information to be sent between the first audio unit 120 and the second audio unit 130.

The I²C interface is also known as the Inter-Integrated Circuit interface, and is normally used to couple two or more integrated circuits together so that control and status information can be interchanged between these components. The I²C interface uses two terminals: a clock and a data line. Generally, the I²C interface allows for control signals to be sent between the first audio unit 120 and the second audio unit 130 over the data line. Accordingly, the interface 110 allows both audio information and control signals to be sent between the first audio unit 120 and the second audio unit 130. However, a total of five terminals are required for the interface 110 to operate.

Figure 2:
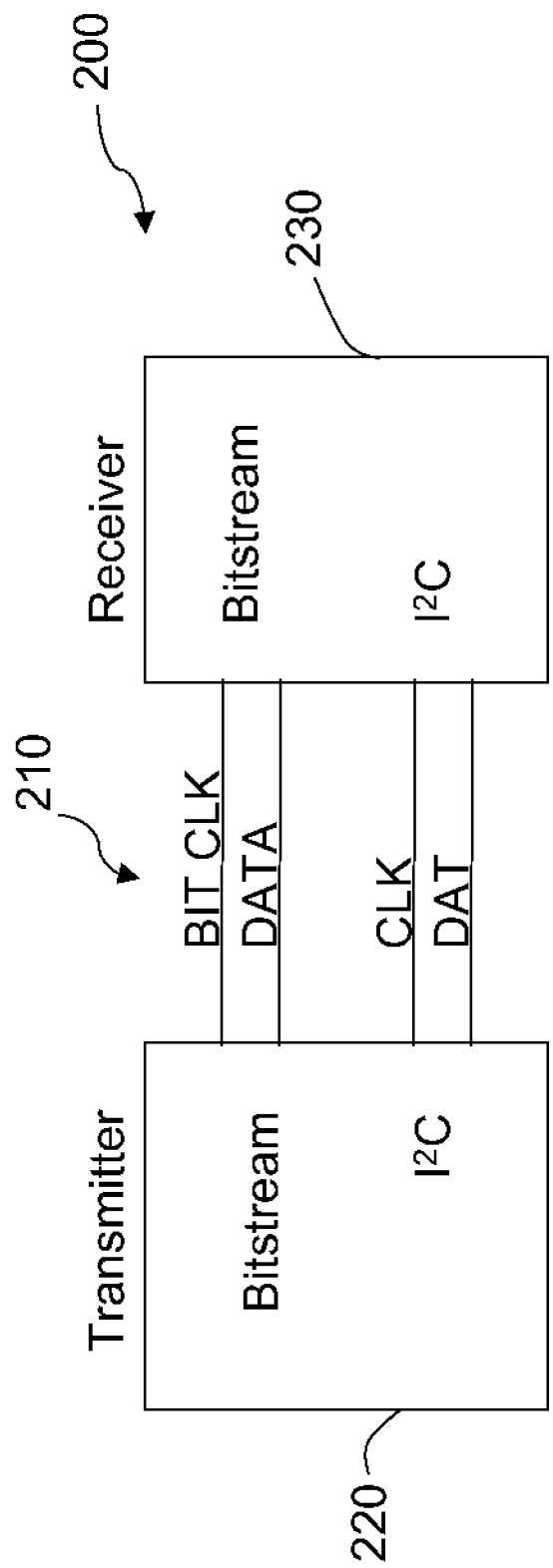
FIG. 2 is a schematic representation of a second known audio system.

Reference is now made to FIG. 2, which is a schematic diagram illustrating a second known audio system 200 including a known communication interface 220 between a first audio unit 220 and a second audio unit 230. As can be seen, the interface illustrated in FIG. 2 includes four terminals. The interface 220 uses both a bitstream interface and the I²C interface as described above.

The bitstream interface uses two terminals: a data line and a clock. The data line can carry bits that are a coded representation of sound. The bitstream is normally generated by a sigma delta modulator but could also be obtained from a storage device or by other techniques. Generally, the bitstream interface allows for audio information to be sent between the first audio unit 220 and the second audio unit 130, while the I²C interface allows for control signals to be sent between the first audio unit 220 and the second audio unit 230. Accordingly, the interface 210 allows both audio information and control signals to be sent between the first audio unit 220 and the second audio unit 230 and provides similar functionally to interface 110. However, a total of four terminals are still required for interface 210.

Each terminal normally adds to the expense of the overall hardware device. In general, the higher the pin count or number of terminals of an integrated circuit, the higher the cost. While in some cases, the additional cost per terminal may not in itself be significant, when a large quantity of devices are manufactured using that chip configuration, the overall costs can become very significant.

Figure 3:
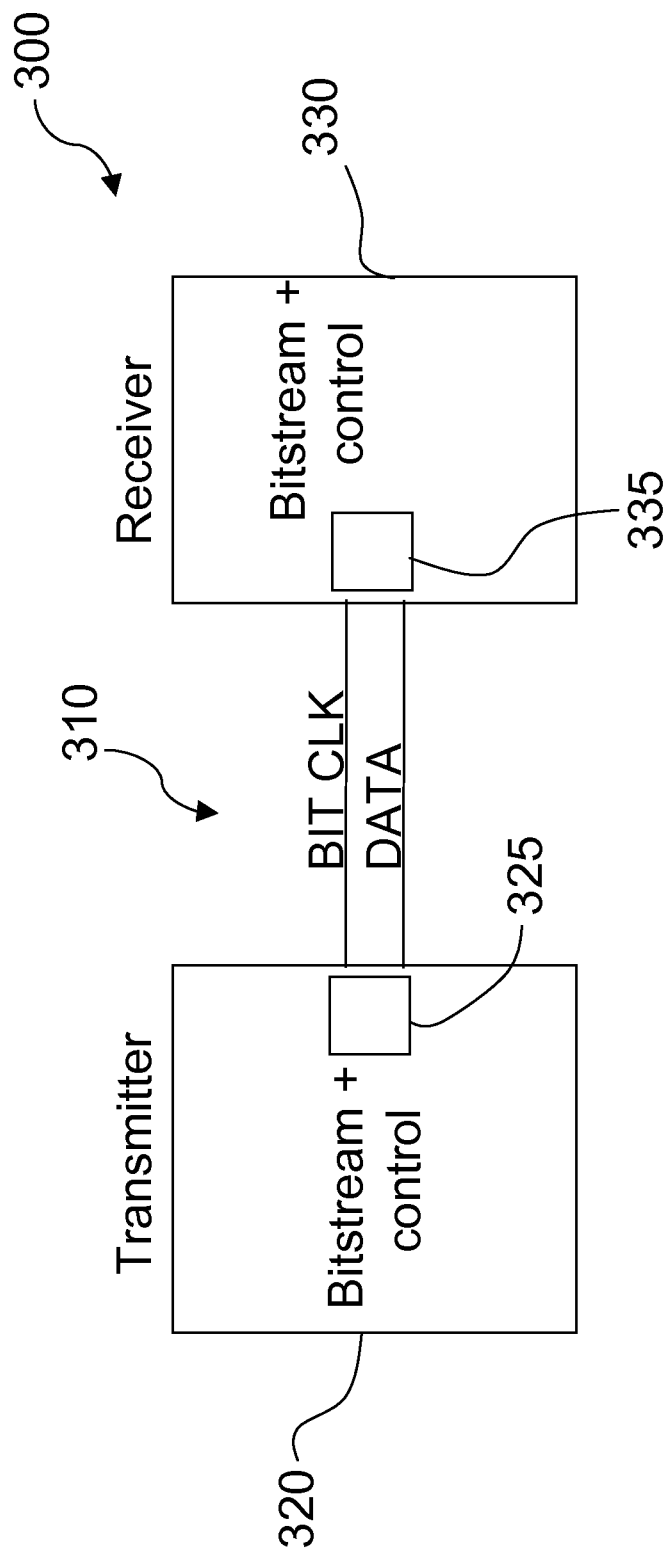
FIG. 3 is a schematic representation of an audio system for encoding control messages in an audio bitstream according to various embodiments.

Reference is now made to FIG. 3, which is a schematic diagram illustrating an audio system 300 for encoding control messages in an audio bitstream according to various embodiments.

As shown, the audio system 300 includes a communication interface 310 between a first audio unit 320 and a second audio unit 330. The first audio unit 320 may include a first integrated circuit and the second audio unit 330 may include a second integrated circuit, with the first and second integrated circuits coupled together through a bitstream interface.

As can be seen from FIG. 3, the interface 310 includes a bitstream interface with only two terminals: a clock line and a data line. Accordingly, the interface 310 uses fewer terminals compared to the interfaces 110, 210 described above.

In some embodiments, the first audio unit 320 may be more generally referred to as a first hardware element, and the second audio unit 330 may be more generally referred to as a second hardware element.

In some embodiments of the system 300, the first audio unit 320 may include a first hardware device and the second audio unit 330 may include a second hardware device. In some embodiments, one hardware device may be part of a electronic device, such as a portable communication device (e.g. a smart phone, cell phone etc.), a gaming device, a portable audio device (e.g. mp3 player, etc.) and so on, while the other of the hardware devices may be part of an audio emitting or receiving device adapted for use with the electronic device (such as a headset, a microphone, speaker, and so on).

In some embodiments, the system 300 may be provided on a single device (e.g., a smart phone, PDA, etc.). In such embodiments, the first audio unit 320 and the second audio unit 330 may both be components of the same device. For example, the first audio unit 320 may be a codec and the second audio unit 330 may be an amplifier on a smart phone device.

In embodiments where the first audio unit 320 is a codec, the codec may be implemented entirely in hardware. In some embodiments, the codec may include a processor executing software.

In some embodiments, first audio unit 320 may include a sigma delta modulator.

In some embodiments, second audio unit 330 includes a digital amplifier. The digital amplifier may be a class D amplifier.

In some embodiments, the data line of the bitstream interface may be configured so that an audio bitstream may be sent from the first audio unit 320 to the second audio unit 330. Furthermore, the data line is configured so that control messages may also be sent from the first audio unit 320 to the second audio unit 330 using the data line (as will be further discussed below).

In some embodiments, control messages may be sent from the first audio unit 320 to the second audio unit 330 by altering the audio bitstream and inserting another bitstream that includes a preamble and a control message selected from a plurality of control messages. For example, in some embodiments the audio bitstream may be interrupted and the preamble and control message may be sent, after which the audio bitstream may be resumed.

In various embodiments, the control message may be based on or generated in response to a particular control command. The control command may be selected from a plurality of control commands. For example, a control command may be initiated by a user taking some action (e.g. adjusting a volume control using an input device, turning off the portable electronic device, etc.).

In some embodiments, a control command may be initiated or selected by the first audio unit 320 or another component of the audio system 300, in some cases automatically. For example, a control command may be initiated based on a temperature reading indicating that a component of the system 300 has exceeded a temperature limit and that one or more components should be deactivated.

In some embodiments, one or more components of the system 300 can select a control command. The selection of a control command can occur in response to any appropriate criteria, such as the status of one or more components of the system (e.g. battery power level), a user input (e.g. a user selection), input from one or more other components of the system 300, input from another system or another component coupled to the audio system 300, and so on.

In some embodiments, the control command is provided to the first audio unit 320. When the first audio unit 320 receives the control command, the first audio unit 320 can then generate a corresponding control message. For example, a first processor 325 on the first audio unit 320 may be configured to receive a control command to power down a particular component on the second audio unit 330. In response, the first processor 325 generates an appropriate control message to be sent over the audio bus, and which will trigger the desired action of powering down that particular component when received and processed by the second audio unit 330.

Generally, before the control message is sent from the first audio unit 320 to the second audio unit 330, a preamble will be transmitted on the audio bitstream bus to indicate to the second audio unit 330 that a control message will be sent over the audio bus. For example, a preamble can be sent along the audio bitstream, and once the second audio unit 330 has identified the preamble, the second audio unit 330 will know that a control message will be forthcoming and can therefore properly interpret the subsequent bitstream as a control message (and not as an audio bitstream). Once the second audio unit 330 receives the control message, the second audio unit 330 can then execute the corresponding control command (e.g. powering down a particular component, etc.).

In some embodiments, the first processor 325 is coupled to the first audio unit 320 and is operable to cause the preamble and control message to be sent via the audio bitstream. In some embodiments, the first audio 320 includes the first processor 325. In other embodiments, the first processor 325 is separate from the first audio unit 320.

In some embodiments, a second processor 335 is coupled to the second audio unit 330, and is operable to monitor the bitstream data line to detect a preamble. Once a preamble is detected, the second processor 335 can monitor the bitstream data line to detect a control message. Once a control message has been detected, the second processor 335 can execute the corresponding control command.

In some embodiments, the second audio unit 330 includes the second processor 335. In other embodiments, the second processor 335 is separate from the second audio unit 330.

In some embodiments, the control message will be sent immediately after the preamble is transmitted on the bitstream. In other embodiments, the control message may be sent at another time (e.g. after a particular time delay, after a particular number of bits have been sent, and so on).

In various embodiments, the preamble and the control message may be sent by altering the audio bitstream that would otherwise have been sent on the data line of the bitstream interface. For example, the audio bitstream may be interrupted or replaced. Accordingly, in some embodiments, an audio bitstream precedes the sending of the preamble, is interrupted by the preamble and control message, and then resumes after the control message has been sent.

In some embodiments, the preamble and control message are sent by replacing audio bits in the audio bitstream with the preamble and control message bits. In some embodiments, this may be done through multiplexing.

In some embodiments, replacing bits can include altering bits, such as by reversing a value of one or more bits (e.g. flipping one or more '0's to '1's and vice versa).

As used herein the term "replace" generally refers to setting a value of a bit to a selected value. In some embodiments, this may be done by simply altering bits to produce the desired values, while in other embodiments this may be achieved by multiplexing various sources of bits.

Figure 4:
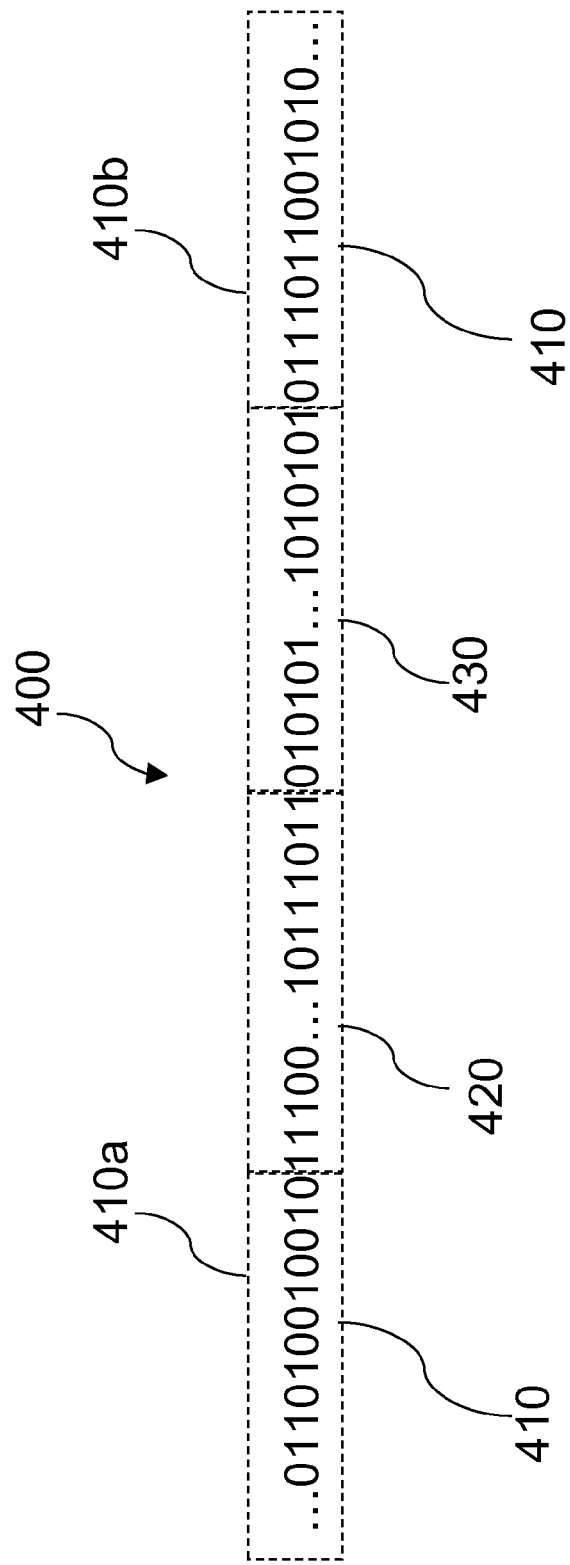
FIG. 4 illustrates an example bitstream that can be transmitted using the interface of the system of FIG. 3.

Reference is now made to FIG. 4, which illustrates an example bitstream 400 that may be transmitted over the data line of interface 310 of FIG. 3 according to some embodiments. As shown, the bitstream 400 includes a first portion 410a of an audio bitstream 410 followed by a preamble 420. The preamble 410 in turn is followed by a control message 430. After the control message 430, the audio bitstream 410 resumes (as indicated by the second portion 410b of the audio bitstream 410).

As described above, in some embodiments, the preamble 420 and control message 430 can be inserted on the data line of interface 310 by interrupting the audio bitstream 410 (e.g. by inserting the preamble 420 and control message between the first and second audio portions 410a, 410b).

In some embodiments, the audio bitstream 410 may be buffered at the second audio unit 330 and analyzed prior to being processed by the second audio unit 330. In some embodiments, the analysis may include identifying one or more preambles and one or more control messages. In some embodiments, this analysis is done to detect the presence of a preamble and control message, and when a preamble and control message are detected, then processing the control message (and not merely as an audio bitstream).

In some embodiments, the preamble may be selected such that the probability of the preamble occurring in a natural audio bitstream is below a selected value. The term "natural audio bitstream" as used herein includes a bitstream that is generated from an audio source such as, for example, music, voice, or other sounds. In some embodiments, the preamble includes a particular combination of bits selected such that the particular combination of bits is unlikely to occur in a natural audio bitstream (e.g. a specific combination of bits repeated a specific number of times).

In some embodiments, the length of the preamble may be selected to be sufficiently long such that the probability of the preamble occurring in a natural audio bitstream is below a selected value.

In some embodiments, both the combination of bits that make up the preamble and the length of the preamble may be selected to make the probability of the preamble occurring in a natural audio bitstream acceptably low.

In some embodiments, statistical analysis may be used to estimate the probability of any particular ordered combination of bits occurring in a natural audio bitstream. Accordingly, the preamble can be selected such that the probability of the preamble occurring in a natural audio bitstream is low enough to inhibit the likelihood of errors (e.g. the preamble can be selected such that it is likely to occur only once in a million years of continuous playback of any natural audio bitstream).

In some embodiments, the preamble includes a binary representation of the hexadecimal number 69 (e.g. 01101001) repeated twenty times. As used herein, the notation 0x69 will be used to represent the hexadecimal number 69 and TX will be used to represent that it is repeated X number of times (e.g. T20 means repeat twenty times). Accordingly, in some embodiments a preamble may be 0x69T20, meaning that hexadecimal 69 is repeated twenty times. It should be understood that this is an example only and that other suitable preambles could be used.

In other embodiments, a preamble may be generated by using a pseudo random generator to get a deterministic sequence with a long repeat length. In some such embodiments, a similar pseudo random generator may be used by the second audio unit 230 for detecting the preamble.

In some embodiments, before an audio bitstream will be transmitted by the first audio unit 320 to the second audio unit 300, the audio bitstream will be analyzed (e.g. by the first processor 325) to determine whether the audio bitstream includes a combination of bits that matches the preamble.

In theory, it is possible for virtually any combination of bits to occur in a natural audio bitstream. Accordingly, it is possible for the first audio unit 320 to inadvertently transmit an audio bitstream that contains a "naturally occurring preamble" (e.g. a combination of naturally occurring bits that corresponds to the selected preamble, such as 0x69T20).

When a bitstream with a naturally occurring preamble is received by the second audio unit 330, that bitstream would be misinterpreted as an actual preamble. In some cases, this could cause the second audio unit 330 to interpret the subsequent audio bitstream as a control message (when in fact no control message had been sent) and therefore the second audio unit 320 may incorrectly trigger a control command or otherwise perform an undesired action (e.g. the second audio unit 330 could interpret the bits following the naturally occurring preamble as a signal to shut down or decrease power when in fact no such action was desired).

To inhibit this from happening, if a naturally occurring preamble is detected, (e.g. by the first processor 325), the combination of bits forming the naturally occurring preamble may be altered to form an altered audio bitstream before that bitstream is sent from the first audio unit 320 to the second audio unit 330 (e.g. one or more bits may be flipped, etc.). The altered audio bitstream may then be transmitted to the second audio unit 330 for processing instead of the naturally occurring preamble, and according the second audio unit 330 will not interpret the subsequent bits as a control message.

In embodiments where the audio bitstream is monitored prior to being sent from the first audio unit 320 to the second audio unit 330, the preamble may be selected to be much shorter than would be the case if the audio bitstream were not monitored. For example, in some embodiments where the audio bitstream is monitored, the preamble may be selected to be 0x69T4 (e.g. hexadecimal 69 repeated four times).

In some embodiments, if a naturally occurring preamble is detected in a natural audio bitstream, then the bitstream may be altered by changing the value of any suitable number of bits (e.g. one or more bits) in at least a portion of the bitstream that corresponds to the naturally occurring preamble. Thus, for example, if the preamble 0x69T4 is detected in a natural audio bitstream, that portion of the audio bitstream may be altered to: {0x69T3, 0x96T1} (e.g. hexadecimal 69 repeated three times, followed by hexadecimal 96 repeated once).

In some embodiments, prior to transmitting a preamble, the audio bitstream is monitored and analyzed (e.g. by the first processor 325) to detect the presence of bits that correspond to a portion of a preamble that is less than the whole preamble (such as for example, the start of a preamble). A natural audio bitstream can from time to time include bits that correspond to a portion of the preamble. For example, in the case where the preamble is 0x69T20, it is possible that immediately prior to transmitting the preamble, the first audio unit 320 may have already transmitted a natural audio bitstream that included one or more consecutive 0x69 symbols. If the preamble is inserted immediately after these 0x69 symbols in the natural audio bitstream, then the second audio unit 330 (when analyzing the received bitstream) may misinterpret the naturally occurring 0x69 symbols as part of the preamble and may therefore prematurely conclude that the preamble has ended. This is problematic, as the remaining 0x69 symbols may be interpreted as part of the control message and not part of the preamble.

Accordingly, in some embodiments, if it is determined audio bitstream may have sent bits corresponding to at least a portion of a preamble (e.g. the start of a preamble), then some corrective action may be taken. For example, the audio bitstream can be modified so that is does not correspond to the portion of the preamble.

As another example, the preamble can be delayed so that it is sent after a portion of the audio bitstream has been detected that does not correspond to any portion of a preamble. For instance, in embodiments where the preamble comprises a plurality of 0x69 symbols, the last bit of each 0x69 symbol is a '1'. Therefore, if the preamble is only sent after a '0' bit has just been transmitted, it will be assured that the preceding bits do not correspond to a 0x69 portion of the preamble. Alternatively, instead of waiting for '0' to naturally occur in the audio bitstream, the audio bitstream can be modified by inserting a '0', or replacing a '1' with a '0'.

In some such embodiments, only the preceding bit may be monitored. In other embodiments, a group of preceding bits may be analyzed to detect the presence of one or more symbols corresponding to the start of a preamble.

In some embodiments, the end of the preamble may be marked so that the second audio unit 330 can identify where the preamble ends, regardless of where the preamble starts. For example, this may be done by using a particular symbol at the end of the preamble. For example, in the case where the preamble comprises "n" consecutive 0x69 symbols, the end of the preamble can be marked with an "end symbol" different from 0x69 (e.g. 0x96). In such embodiments, even if the preamble is inserted directly after one or more 0x69 symbols in the audio bitstream have naturally occurred, the end of the preamble can be identified by the end symbol (thus inhibiting the second audio unit 330 from prematurely concluding that the preamble has ended).

In some such embodiments, receipt of a preamble may be determined to have occurred when "n" or more consecutive 0x69 symbols have been received, followed by a particular end symbol (e.g. 0x96).

In another example, where the preamble is generated by a pseudo random number generator, the preamble can be terminated with an end symbol corresponding to "n" or more zeros (e.g. where "n" is equal to the size of the register length of the pseudorandom number generator).

The preceding paragraphs describe various examples of how the preamble can be transmitted such that the receiving unit (e.g. the second audio unit 330) may properly detect the end of a preamble.

In some embodiments, to increase the robustness of the interface, the control message may also include an error control. The error control can be any suitable error control, for example a checksum or the XOR value of the control message number and the message itself. In some cases, the error control can be a control byte or any other suitably sized error control.

In some embodiments, if the error control indicates that an error has occurred, then the previous control message may be ignored. In some embodiments, this may help prevent the second audio unit 330 from executing an incorrect control command where the control message has been corrupted.

The following is a discussion of some example control messages using the preamble 0x69T18, followed by a control message (indicating the type of control command to be executed), an optional payload or value (which could be related to the type of control command), and an optional an error control.

The following list of sixteen exemplary control messages uses this notation: (value) means an 8-bit quantity, ((value)) is a 16-bit quantity, [value] is a 32-bit quantity and [[value]] is a 64-bit quantity.

Message 0: reset device: {0x69T18, 0x00, (reset), (error control)}

In some embodiments, example control message 0 can be used to reset all or portions of the device incorporating the second audio unit 330. For example, in some embodiments reset value 0x00 may be used to reset the entire device, while other values may be used to reset one or more other portions of the device.

Message 1: General 8 bit register write: {0x69T18, 0x01, (REG number), (REG value), (error control)}

In various embodiments, example control message 1 can be used to write to an 8-bit register. Example control messages 2, 3 and 4 below are similar except that they involve writing to 16-bit, 32-bit, and 64-bit registers respectively. As will be understood by those skilled in the art, control messages analogous to control messages 1-4 could be used to read from (instead of writing to) registers.

Message 2: General 16 bit register write: {0x69T18, 0x02, ((REG number)), ((REG VALUE)), ((error control))}

Message 3: General 32 bit register write: {0x69T18, 0x03, [REG number], [REG VALUE], [error control]}

Message 4: General 64 bit register write: {0x69T18, 0x04, [[REG number]], [[REG VALUE]], [[error control]]}

Message 5: Transfer long file: {0x69T18, 0x05, [[file length in bytes]],<file>, [[error control]]}

In various embodiments, example control message 5 could be used to transfer a large file. For example, this could be used with a smart phone that includes an mp3 player. The file could be an mp3 file and once the file has been transferred, some components of the smart phone could be powered down to conserve power.

Message 6: Gain control: {0x69T18, 0x06, (gain), (error control)}

Example control message 6 can be used to adjust the gain of a component, such as an amplifier.

Message 7: Slew rate control: {0x69T18, 0x07, (slew rate), (error control)}

Example control message 7 can be used to control the slew rate of a circuit element, such as a class D amplifier. In some embodiments, such as where system 300 is provided on a smart phone, decreasing the slew rate can decrease the electromagnetic interference that may otherwise result. Specifically, decreasing the slew rate may remove some of the higher harmonics from a signal. These harmonics may be in the range of the frequency used for communicating with other systems (such as a cell tower or other communication devices). Given that these higher harmonics are often outside the human audible range, this may generally be done without significantly distorting the audio output. However, adjusting the slew rate in such a manner may cause a decrease in power efficiency by the class D amplifier.

Message 8: Set maximum power output: {0x69T18, 0x08, (power), (error control)}

Example control message 8 can be used to limit the maximum amount of power outputted by a particular element of system 300. In various embodiments, this may be used for safety reasons. In some embodiments, it could be used to limit the power output of the speaker, or another particular element of the device.

Message 9: set maximum output current: {0x69T18, 0x09, (current), (error control)}

In various embodiments, example control message 9 can be used to limit the current supplied to a speaker. This may be useful to prevent overcurrent situations.

Message 10: Enable spread spectrum modulation: {0x69T18, 0x0A, (spread spectrum value), (error control)}

In various embodiments, example control message 10 can be used to modulate the clock signal. In some embodiments, the spread spectrum value may vary from 0x00 (no spread spectrum) to 0xFF (maximum spread spectrum activity). In various embodiments this may be used for output emission control. Specifically, by modulating the clock frequency and spreading its energy over a number of frequencies, the energy at any specific frequency is reduced and therefore the overall interference can be reduced.

Message 11: set maximum temperature of device: {0x69T18, 0x0B, (temperature), (error control)}

In various embodiments, example control message 11 can be used to limit the temperature of the device. For example, in some embodiments, the voltage value and the current at a terminal can be used to determine the impedance of the element coupled to that terminal. In addition, the impedance values of the circuit element may be known for a variety of corresponding temperate values. Accordingly, in some embodiments, the voltage or the current (or both) may be monitored and controlled to adjust the temperate of the device or an external transducer.

Message 12: set speaker impedance: {0x69T18, 0x0C, (impedance), (error control)}

In various embodiments, example control message 12 may be used to limit the temperature of the device, the signal output slewrate, or the maximum output voltage.

Message 13: Set outside temperature: {0x69T18, 0x0D, (temperature), (error control)}

In various embodiments, example control message 13 may be used to limit the temperature of the device. For example, in some embodiments, this may be done based on readings from the battery.

Message 14: Set mute control: {0x69T18, 0x0E, (mute value), (error control)}

In various embodiments, example control message 14 may be used to set the attack/decay time of a mute control in order to minimize audible artifacts when muting is activated/deactivated.

Message 15: Enable spatial stereo enhancement: {0x69T18, 0x0F, (spatial value), (error control)}

In various embodiments, example control message 15 may be used to set the spatial stereo enhancement level of a device in order to maximize the spatial audio perception during playback. In some embodiments, this may be accomplished through the use of two or more speakers and by controlling one speaker to emit anti-sound with respect to the other speaker. For example, the phase of the signals may be adjusted to make the speakers appear (from the perspective of the listener's ear) to be further apart. In some embodiments, this may be done using speakers that are four or more centimeters apart. In other embodiments, this may be done using speakers that are eight or more centimeters apart.

As can be seen from the above discussion, each of the control messages generally includes or references a particular control command. Generally, the control command is a command or instruction to perform a particular function. For example, as described above control message 7 includes a control command to adjust the slew rate, while control message 9 includes a control command to set the maximum output current.

Each control message can also include additional elements. For example, the control message can include particular coding and formatting that is independent of the actual control command itself. Furthermore, a control message may include an error control element.

Figure 5:
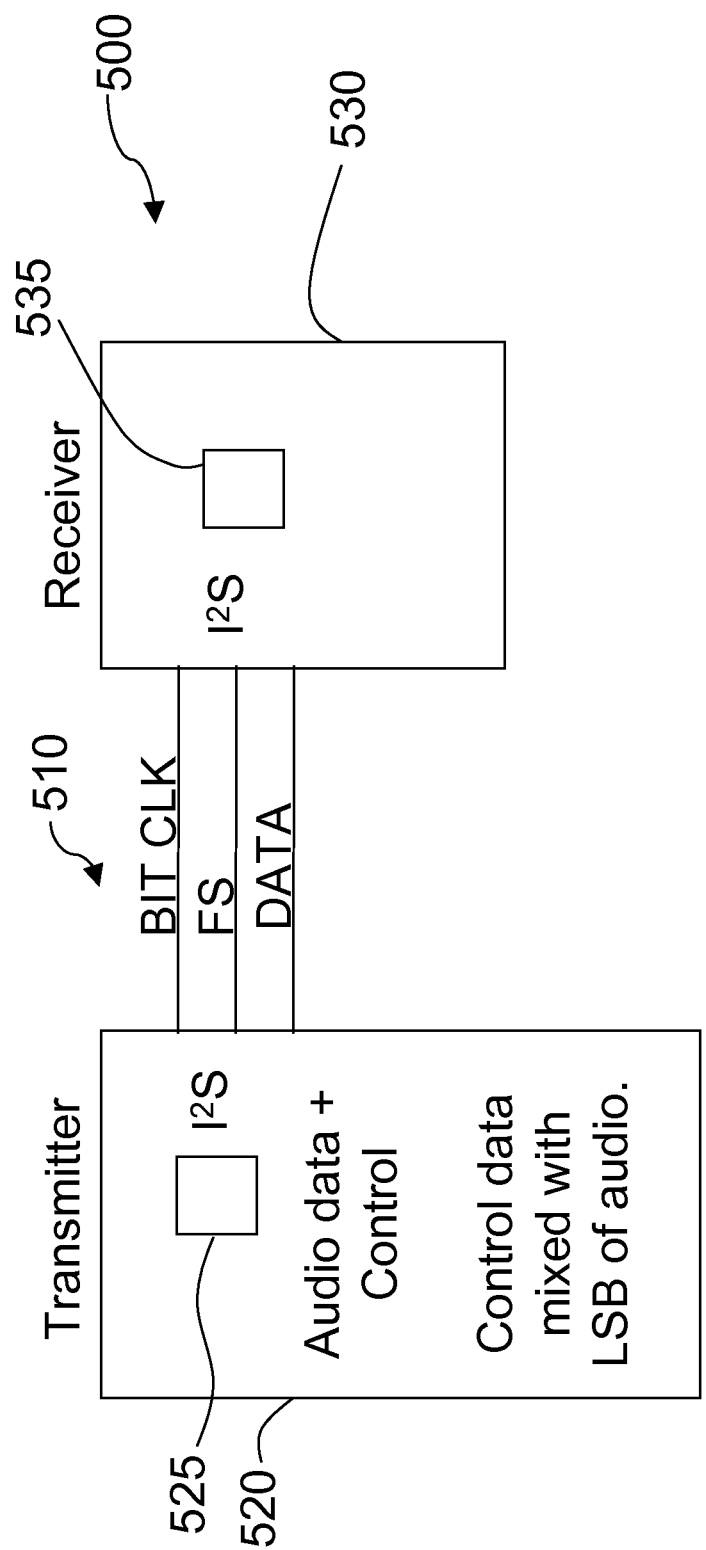
FIG. 5 is a schematic representation of an audio system for encoding control messages in an audio bitstream according to various embodiments.

Reference is now made to FIG. 5, which is a schematic diagram illustrating an audio system 500 comprising a communication interface 510 between a first audio unit 520 and a second audio unit 530 according to various other embodiments. The first audio unit 520 may include a first integrated circuit and the second audio unit 530 may include a second integrated circuit, where the first and second integrated circuits are coupled through an audio interface.

As can be seen from FIG. 5, the communication interface 510 includes an $I^2S$ interface with three terminals: a bit clock, a word select, and a data line.

In some embodiments, the first audio unit 520 may be generally referred to as a first hardware element and the second audio unit 530 may be generally referred to as a second hardware element.

In some embodiments of the system 500, the first audio unit 520 can be part of or include a first hardware device, and the second audio unit 530 may be part of or include a second hardware device. In some embodiments, one hardware device may be a portable electronic device such as a portable communication device (e.g. a smart phone, cell phone etc.), a gaming device, or a portable audio device (e.g. mp5 player etc.), while another of the hardware devices may be an associated electronic device such as a headset, a microphone, and so on.

In some embodiments, system 500 may be provided on a single device (e.g. a smart phone or PDA). In such embodiments, the first audio unit 520 and the second audio unit 530 may each be components of the same device. In some such embodiments, the first audio unit 520 may be a codec and the second audio unit 530 may be an amplifier.

In some embodiments, the first audio unit 520 may include a sigma delta modulator followed by a decimator. In some embodiments, the second audio unit 530 may include a digital amplifier. In some embodiments, the digital amplifier may be a class D amplifier.

In various embodiments, the data line of the $I^2S$ interface may be used to transmit audio data words from the first audio unit 520 to the second audio unit 530. Furthermore, control messages may also be sent from the first audio unit 520 to the second audio unit 530 using the data line (as will be described below).

In some embodiments, the control messages are sent by altering or replacing some of the audio bits that would have otherwise have been transmitted if the control message were not sent. In some embodiments, this is done by replacing at least some of the bits of at least some of audio words that would otherwise be transmitted with the control message.

In some embodiments, a portion of each word in a group of audio words can be replaced with bits corresponding to the control message. The portion could be any number of bits, from one bit to the entire word length. In some embodiments, the control word may be in both the left and right audio data channels. In other embodiments, the control word may be in only one of the left and right audio channels.

In some embodiments, all of the bits in the audio message may be replaced by bits corresponding to the control message. In some other embodiments, a single bit of the audio word may be replaced. Accordingly, if a control message is to be sent, then the control message can replace a selected number of bits in each consecutive audio word until the entire message is sent.

It should be understood that it is not necessary for each consecutive audio word to carry control bits. Thus, for example, every second, third, forth, etc., audio word can carry one or more bits corresponding to the control message.

In some embodiments, the least significant bit of each audio word is replaced with a bit corresponding to the control command. Replacing only the least significant bit of an audio word tends to minimize the distortion of the audio content (and in some embodiments may make the distortion inaudible).

In some embodiments, prior to transmitting a control message, a preamble is transmitted on the audio bus to indicate that a control message will follow. Once the second audio unit 530 has identified a preamble, the second audio unit 530 knows that a control message will be sent and can therefore interpret the subsequent audio words as comprising one or more bits that correspond to a control message (as opposed to audio content). In other words, this technique allows for identification of the appropriate bits that include control messages and not audio content.

In some embodiments, a first processor 525 is coupled to the first audio unit 520 and is operable to cause the preamble and control message to be sent, and a second processor 535 is coupled to the second audio unit 530 and is operable to monitor the audio data line for a preamble. Once a preamble is detected, the control message that follows is identified and processed by the second processor 535 as a control message and not as audio data.

In some embodiments, the control message immediately follows the preamble. In other embodiments, the control message may be sent at another time (e.g. after a particular time delay or a delay of a number of bits).

In some embodiments, prior to audio content being transmitted by the first audio unit 520, the first processor 525 analyses the audio content to detect a combination of bits that matches the preamble (e.g. a naturally occurring preamble). If a combination of bits that matches the preamble in natural audio content is detected, the combination of bits may be altered to form altered audio content. The altered audio content is then transmitted to the second audio unit 530 for processing instead of the naturally occurring preamble.

In some embodiments, control messages comprising I²C messages are sent over an audio bus. As mentioned above, control messages can include any suitable content. Accordingly, in various embodiments, control messages can be used to send messages over an audio bus that are normally sent through an I²C interface. This may be referred to as "tunneling" I²C messages through the audio bus. In various embodiments, the audio bus may be the audio bus of interface 310 of FIG. 3 or the audio bus of interface 510 of FIG. 5.

In some such embodiments, messages can be bidirectional and may be sent from the first audio units 320 or 520 to the second audio units 330 or 530, as well as from the second audio units 330 or 530 to the first audio units 320 or 520. In some embodiments, in order to facilitate the bidirectional transfer of messages, the drivers used by the first and second audio units 320, 330, 520, 530 may be modified to support bidirectional travel of information.

It should be understood that bidirectional travel information over audio interfaces 310 and 510 is not limited to the case where control messages comprise I²C messages. In various embodiments, any appropriate information can be transferred in either direction between the two audio units. In some such embodiments, the drivers utilized by the audio units may be modified in order to accommodate the bidirectional travel of information.

It should be understood that the same or similar preambles and control commands as discussed above in relation to FIG. 3 can also be used by the embodiments illustrated in FIG. 5. For example, each of the example control commands discussed above can also be used in relation to the embodiments illustrated in FIG. 5.

Figure 6:
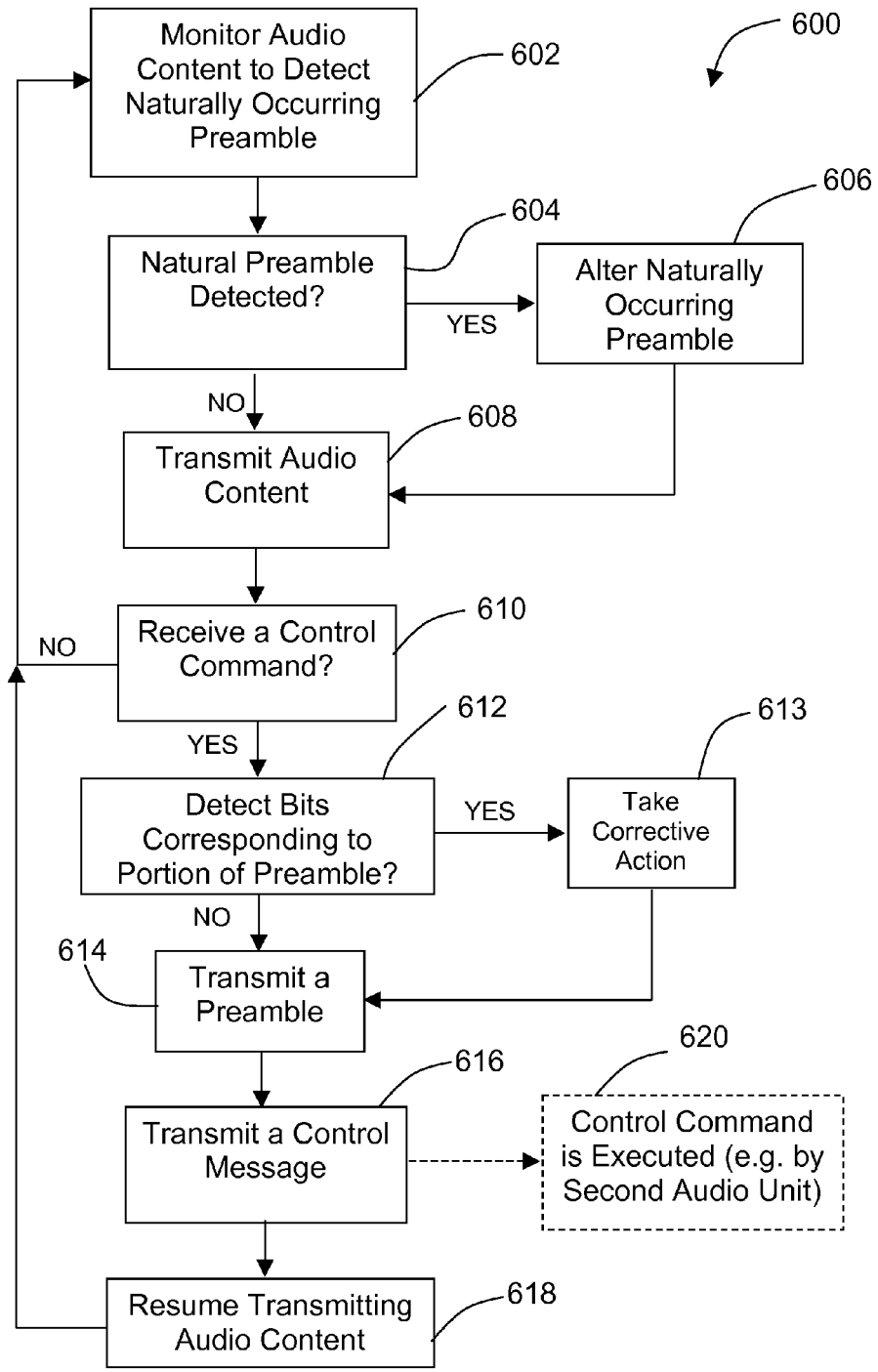
FIG. 6 is a schematic representation of a method of encoding control messages in an audio bitstream according to some embodiments.

Reference is now made to FIG. 6, which is a flow chart diagram illustrating a method 600 for encoding control messages in an audio bitstream.

At step 602, the audio content to be transmitted (e.g. from the first audio unit 320 to the second audio unit 330) is monitored before being transmitted.

At step 604, a determination is made whether the monitored audio content includes a naturally occurring preamble. If a naturally occurring preamble has been detected, then at step 606 the audio content can be altered (e.g. by flipping one or more bits) to create an altered audio bitstream that will be transmitted instead of the naturally occurring preamble.

At step 608, the audio content is then transmitted (e.g. from the first audio unit 320 to the second audio unit 330). As discussed above, the audio content is transmitted as bits over an audio bus.

At step 610, a determination is made whether a control command is received. If no control command is received, then the method 600 may return to step 602 where the next portion of audio content can be analyzed. However, if a control command is detected (e.g. the user makes a specific input on a portable electronic device), the method 600 may proceed to step 612.

At step 612, the transmitted audio content is analyzed to determine whether the audio bitstream included bits corresponding to at least a portion of a preamble (in various embodiments this may be done before the audio content is transmitted or after the audio content is transmitted). If the audio bitstream includes bits corresponding to at least a portion of a preamble, then the method 600 proceeds to step 613. Otherwise the method 600 proceeds to step 614.

At step 613, some corrective action is taken to inhibit the errors occurring when the preamble is transmitted. For example, the audio bitstream can be modified so that is does not correspond to the portion of the preamble. Alternatively, the transmission of the preamble can be delayed so that it is sent only after a portion of the audio bitstream has been detected that does not correspond to any portion of a preamble.

At step 614, the preamble (e.g. a suitably selected preamble, such as 0x69T20) is transmitted over the audio bus. The preamble will indicate to the second audio unit that a control message is forthcoming.

At step 616, a control message (corresponding to the control command) is sent over the audio bus. As described above, the control message may include both an indication of the control command to be executed, other information (such as a payload or value related to the control command), and an error control.

At step 618, once the control message has been sent, the transmission of audio content over the audio bus can resume (and in some embodiments, the method 600 returns to step 602).

The control message will be received at step 610 (e.g. by the second audio unit 330), and the corresponding control command may then be executed (e.g. the second audio unit 330 may take the appropriate action, such as power down a component as instructed by the control command, adjust the gain, slew rate, etc.). In some embodiments, if the second audio unit 330 detects an error (e.g. based on the error control), then the second audio unit 330 may disregard the control message.

The foregoing aspects of the method and the electronic device are provided for exemplary purposes only. Those skilled in the art will recognize that various changes may be made thereto without departing from the spirit and scope of the method and the electronic device as defined by the appended claims.

The invention claimed is:

1. An audio system comprising:
a first audio unit;
a second audio unit coupled to the first audio unit through an audio bus;
a first processor coupled to the first audio unit, the first processor configured to transmit bits comprising audio content to the second audio unit over the audio bus;
the first processor further configured to:
receive a control command selected from a plurality of control commands, and in response, interrupt the bits comprising audio content and send a preamble and a control message on the audio bus, wherein the control message corresponds to the control command; and
analyze the bits comprising audio content before they are transmitted to the second audio unit to detect a naturally occurring preamble, and if a naturally occurring preamble is detected then alter at least one bit of the naturally occurring preamble to form an altered audio bitstream and transmit the altered audio bitstream over the audio bus instead of the naturally occurring preamble; and
a second processor coupled to the second audio unit, the second processor configured to monitor the audio bus for a preamble, and if a preamble is detected, then process the control message and execute the corresponding control command.

2. The audio system of claim 1, wherein the first processor is configured to monitor the audio content prior to transmitting the preamble to detect the presence of bits that correspond to at least a portion of the preamble.

3. The audio system of claim 2, wherein, if the first processor detects the presence of bits that correspond to at least a portion of the preamble, the first processor is further configured to modify the audio content corresponding to at least a portion of the preamble prior to sending the preamble.

4. The audio system of claim 2, wherein, if the first processor detects the presence of bits that correspond to at least a portion of the preamble, the first processor is further configured to delay sending the preamble until after detecting a portion of the audio content that does not correspond to at least a portion of the preamble.

5. The audio system of claim 1, wherein the control message includes an error control, and wherein the second processor is configured to ignore a control message if the error control indicates that an error has occurred.

6. The audio system of claim 1, wherein the first audio unit and second audio unit are components of the same device.

7. The audio system of claim 6, wherein the first audio unit is a codec and the second audio unit is an amplifier.

8. The audio system of claim 6, wherein the device a portable electronic communication device.

9. The audio system of claim 1, wherein the first audio unit is a component of a first device and the second audio unit is a component of a second device.

10. The audio system of claim 1, wherein the preamble is selected such that the probability of the preamble occurring in a natural audio bitstream is below a selected value.

11. The audio system of claim 10, wherein the length of the preamble is selected to be sufficiently long such that the probability of the preamble occurring in a natural audio bitstream is below a selected value.

12. The audio system of claim 1, wherein the bits comprising audio content is an audio bitstream.

13. The audio system of claim 1, wherein the bits comprising audio content comprise audio data words, and wherein the preamble is selected such that a probability of the preamble occurring in a sequence of natural audio data words is below a selected value.

14. The audio system of claim 13, wherein sending the control message comprises replacing at least a portion of the bits.

15. A method for encoding control messages in an audio system, comprising:
transmitting bits comprising audio content from a first audio unit to a second audio unit over an audio bus;
receiving a control command selected from a plurality of control commands;
interrupting the bits comprising audio content;
sending a preamble and a control message from the first audio unit to the second audio unit on the audio bus, the control message corresponding to the control command; and
analyzing the bits comprising audio content before they are transmitted to the second audio unit to detect a naturally occurring preamble, and if a naturally occurring preamble is detected then altering at least one bit of the naturally occurring preamble to form an altered audio bitstream and transmitting the altered audio bitstream over the audio bus instead of the naturally occurring preamble;
wherein the second audio unit monitors the audio bus for a preamble, and if a preamble is detected, then processes the control message and executes the corresponding control command.

16. The method of claim 15, further comprising monitoring the audio content prior to transmitting the preamble to detect the presence of bits that correspond to at least a portion of the preamble.

17. The method of claim 16, wherein, if bits that correspond to at least a portion of the preamble are detected, then modifying the audio content corresponding to at least a portion of the preamble prior to sending the preamble.

18. The method of claim 16, wherein, if bits that correspond to at least a portion of the preamble are detected, then delaying sending the preamble until after detecting a portion of the audio content that does not correspond to at least a portion of the preamble.

19. The audio system of claim 14, wherein replacing at least a portion of the bits comprises replacing a least significant bit of at least a portion of the audio data words.

* * * * *

UNITED STATES PATENT AND TRADEMARK OFFICE
CERTIFICATE OF CORRECTION

Page 1 of 1

PATENT NO.         : 9,032,131 B2
APPLICATION NO.    : 13/020850
DATED              : May 12, 2015
INVENTOR(S)        : Poulsen It is certified that error appears in the above-identified patent and that said Letters Patent is hereby corrected as shown below:

In the claims
Column 15, line 55, claim 8: Insert -- is -- after "device".

Signed and Sealed this
Twenty-seventh Day of October, 2015

Michelle K. Lee
*Director of the United States Patent and Trademark Office*